INVENTOR
FRANCIS C. MEARS
BY Arthur Frelich
ATTORNEY

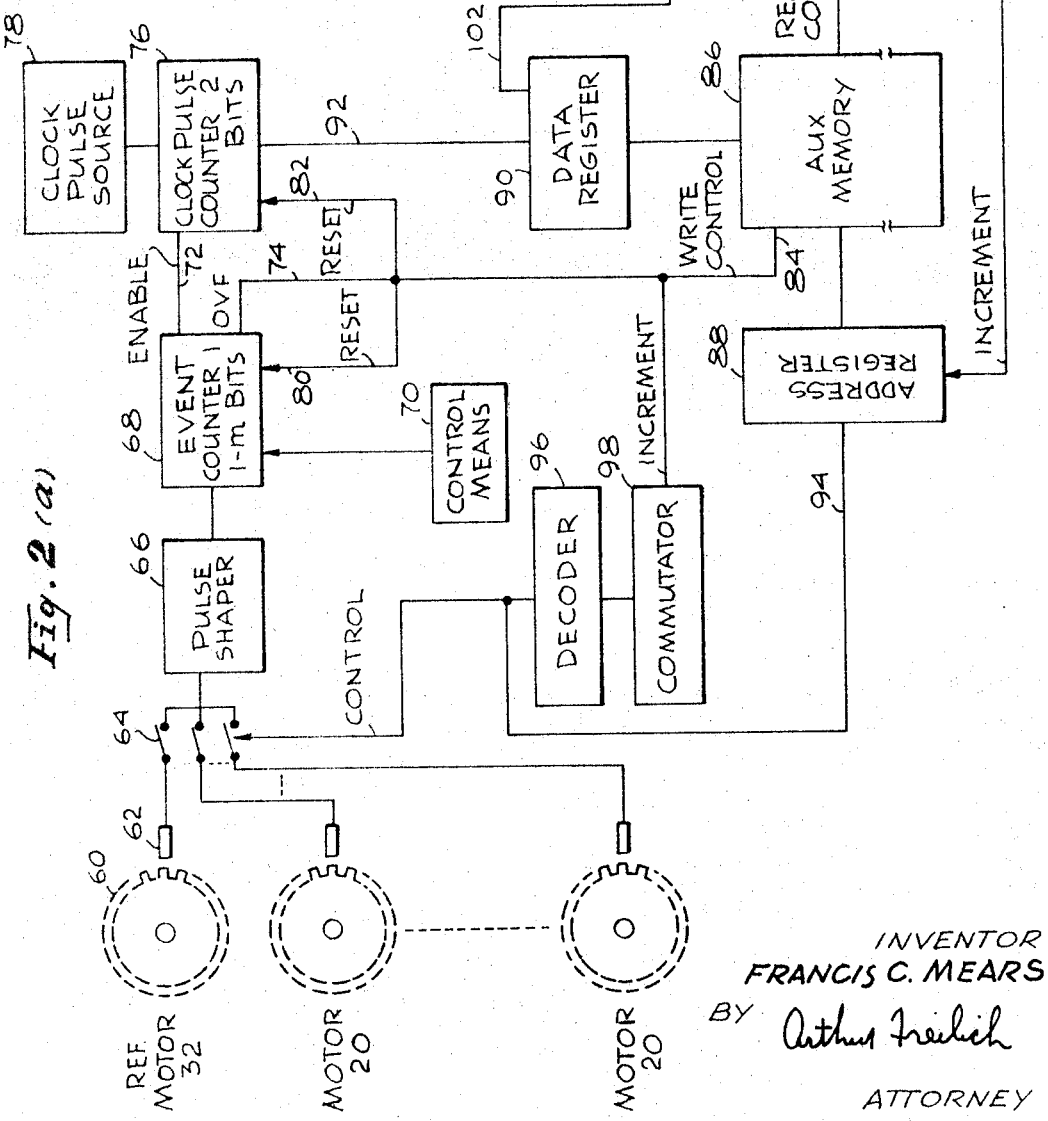

United States Patent Office 3,465,223
Patented Sept. 2, 1969

3,465,223
SPEED MEASURING SYSTEM
Francis C. Mears, Canoga Park, Calif., assignor to The Bunker-Ramo Corporation, Stamford, Conn., a corporation of Delaware
Filed May 10, 1965, Ser. No. 454,594
Int. Cl. H02p 5/50
U.S. Cl. 318—72
9 Claims

ABSTRACT OF THE DISCLOSURE

A system for individually controlling the speed of a plurality of motors. The system includes apparatus capable of measuring absolute motor speed by determining the time duration required to count a predetermined number of events, e.g., the number of markers driven by the motor past a fixed point. Programmed digital computer means are utilized for computing desired motor speeds and for comparing the desired speeds with the measured speeds to develop correction signals for adjusting the speeds of the motors.

---

This invention relates to improvements in control systems of the type in which it is desirable to control the rate of movement of various system elements.

In many manufacturing systems, it is necessary to accurately control the absolute and relative rate of movement of various system elements in order to manufacture a product of high uniform quality. For example, in a paper manufacturing system, paper is formed by initially dispensing a slurry of water and pulp particles onto a moving wire grid from which the water is drawn by vacuum devices. The resulting pulp particle substance is successively pressed by a series of sets of roller which simultaneously draw or stretch the substance to ultimately form paper. The paper is drawn by establishing a speed differential between adjacent sets of rollers. If the draw or speed differential is too great, the paper will break. If the draw is insufficient, the end product will not be of uniformly desired thickness. In addition to it being necessary to control the draw, it is also advantageous to be able to control the overall machine speed since different speeds are required to manufacture different grades of paper. E.g., on one exemplary machine, 90 lb. paper is produced when the machine is run at 700 feet per minute (f.p.m.) and 33 lb. paper when it is run at 1700 f.p.m.

In an exemplary conventional system, each roller set is powdered by an individual DC motor whose armatures receive the same DC potentials. A cue tachometer is coupled to each of the drive motors and provides an electrical output signal proportional to speed. A reference motor for the system is provided which has a reference tachometer coupled thereto. The output signal from the reference tachometer is compared with the signal from each cue tachometer and each differential voltage, so developed, is used to control a speed regulator coupled to the associated drive motor. A potentiometer in each of the comparison circuits permits the speeds of the motors and thereby the draws, to be established. Indicators which display the various draws for an operator are usually provided to inform him when the speed of any of the motors needs adjustment.

In accordance with one aspect of the present invention, a system is provided in which the speed of various system elements is controlled by a computer without the necessity of human intervention. In order to introduce such control, it is desirable to provide means for measuring the absolute speed of each of the drive motors and accordingly one object of the present invention is to provide such a speed measuring means.

Briefly, in accordance with one aspect of the invention, an apparatus is provided for counting events and for precisely measuring the time duration of an interval initiated in response to the first event and terminated in response to the last event.

Thus, an apparatus in accordance with the invention is capable of measuring absolute motor speed by determining the time duration required to count, e.g., a predetermined number of teeth on a gear secured to the motor shaft. In this manner, various motor speeds can be measured and from these measurements draws can be computed. Measuring, computation, and control can all be controlled by a programmed digital computer. The computer in addition can selectively determine the number of predetermined counts to be counted.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

FIG. 2(a) is a schematic block diagram of a speed measuring apparatus in accordance with the present invention;

FIG. 2(b) is a waveform chart illustrating waveforms occurring at various points in the apparatus of FIG. 2(a);

Figure 1:
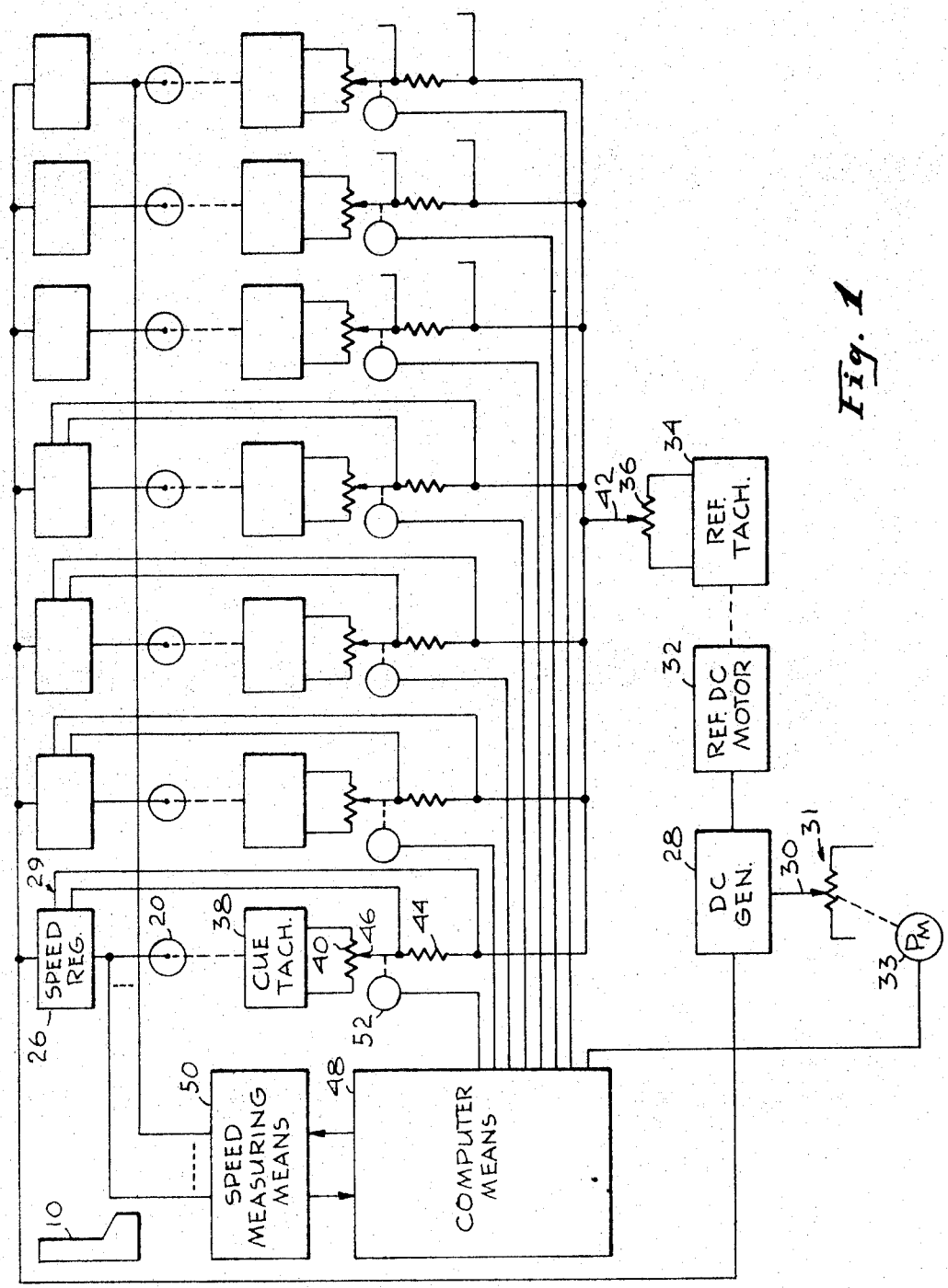
FIGURE 1 is a schematic diagram of a papermaking machine controlled in accordance with the present invention.

Attention is now called to FIG. 1 of the drawings which schematically illustrates a papermaking machine including a head box 10 for dispensing a slurry of water and pulp particles onto a wire grid (not shown) from which the water is drawn to form a pulp particle substance which is then pressed and drawn through a series of sets of rollers. Each set of rollers is driven by a different motor which motors are all generally represented in FIG. 1 by the numeral 20. Generally, these motors are of the DC type whose speeds are controlled by the current supplied to their field windings. Each field winding current is in turn controlled by a different speed regulator device 26, each of which couples one of the motors 20 to a source of DC potential e.g., a DC generator 28. Speed regulators of the type illustrated in FIG. 1 are readily available on the market. Each of the speed regulators tends to hold the speed of the motor 20 connected thereto constant but is responsive to an error potential applied across terminals 29. Thus for example, as the potential applied across terminal 29 increases, so does the field current to the motor 20 and the speed thereof.

The DC potential provided by the DC generator 28 is determined by the speed of the generator which in turn is determined by the potential applied thereto from the movable tap 30 of potentiometer 31. A motor 33 is provided for physically driving tap 30 along potentiometer 31. As will be seen hereinafter (column 6), the motor 33 is driven by computer means 48 in response to information derived from the calculations represented in FIG. 4(a). In addition, the output of the DC generator 28 is used to drive a reference DC motor 32 which in turn drives a reference tachometer 34 which provides an output potential across potentiometer 36 related to the speed of the motor 32.

A cue tachometer 38, which can be identical in construction to the reference tachometer 34, is driven by each of the motors 20. Each cue tachometer 38 develops an output potential across a potentiometer 40 proportional to the speed of the motor 20 driving it.

The potentiometer 36 has a tap 42 fixed thereto. Each of a plurality of resistors 44 connects the tap 42 to a different one of the movable taps 46 of potentiomters 40. The terminals 29 of each of the speed regulators 26 are connected across the associated resistor 44. The nominal speed of a motor 20 is established by fixing the tap 46 at a particular position on the pontentiometer 40. When the motor 20 is running at the proper speed, the potential on the tap 46 associated therewith and the tap 42 associated with the reference tachometer 34 will be equal and therefore no error potential will be developed across the corresponding resistor 44 and be applied to the speed regulator. On the other hand, if the speed of the motor 20 is either too slow or too fast for its setting, an error potential of appropriate sign and amplitude will be developed across the resistor 44 to cause the speed regulator 26 to modify the speed of the motor 20. Of course, the speed regulators 26 function to adjust speed by only a limited amount and thus it is more usual for the speed of a motor 20 to be adjusted by an operator moving the tap 46 associated with that motor. Conventionally, the operator will make a decision as to when speed adjustment is necessary based on the draw or differential speed between adjacent motors 20. As previously noted, for a particular weight paper, it is necessary that the speed of the overall machine be at a certain level. The speed of the overall machine is, of course, determined by the position of the tap 30 on the potentiometer 31 which establishes the potential on and the speed of the DC generator 28. On the other hand, if the draw between adjacent motors 20 is excessive, the paper will break.

In accordance with the present invention, the speeds of the motors 20 are adjusted by a digital computer means 48 acting in response to a speed measuring means 50 (shown in detail in FIG. 2($a$)) which determines the absolute speed of each of the motors 20. The computer means 48 operates to control each of a plurality of potentiometer motors 52, as is explained hereinafter (column 6). Each of the motors 52 is physically coupled to a different one of the taps 46 to move it along a potentiometer 40 connected across one of the cue tachometers 38. The computer means 48 also controls potentiometer motor 33 which in turn controls potentiometer tap 30. As will be appreciated hereinafter, the computer means 48 is called upon to perform only relatively simple calculations and can therefore comprise virtually any general purpose digital computer such as the TRW 340.

Attention is now called to FIG. 2($a$) which illustrates a schematic block diagram of the speed measuring means 50 of FIG. 1. The speed measuring means 50 includes a plurality of gears 60, each secured to and driven by the shaft of a different one of the motors 20. The gears 60 can, but need not, be identical. Preferably, each has uniformly spaced teeth formed on the circumferential edge thereof. Positioned proximate to each of the gears 60 is a detector 62 capable of counting each of the teeth passing thereby. The detector 62 can comprise a magnetic detector, a photodetector, or some other type of detection means. The particular natures of the gear 60 and detector 62 are not significant to the present invention and suffice it to say that all that is necessary is that a means driven by a motor 20 be provided having a plurality of markers (e.g., teeth) thereon which can be counted by the detector 62 as they are moved therepast. Line A of FIG. 2($b$) illustrates an exemplary pulse train available from the detector 62 in response to the gear 60 rotating proximate thereto.

Each of the detectors 62 is connected through a switch 64 to the input of a pulse shaper 66 which responds to the irregular pulses shown in line A of FIG. 2($b$) to form more uniform pulses as shown in line B of FIG. 2($b$). The output of the pulse shaper 66 is coupled to the input of an event counter 68 which can comprise any of several well-known binary counters capable of counting to $2^m$. The value of $m$ can be determined by a control means 70.

The event counter 68 is provided with two output lines 72 and 74. The counter 68 provides a signal on output line 72 in response to the first count being registered therein. It applies a signal to the overflow output line 74 in response to the $2^m+1$ pulse applied to the input thereof. The output line 72 is connected to the enable input terminal of a clock pulse counter 76, which, when enabled, counts clock pulses provided by a source 78. The counter 76 can comprise any of several well-known binary counters.

The overflow output line 74 of the event counter 68 is connected to the reset input terminals 80 and 82 of both counters 68 and 76. In addition, it is connected to a write control terminal 84 of an auxiliary memory 86, which can, for example, comprise a conventional digital magnetic core memory. The auxiliary memory 86 has an address register 88 and a data register 90 associated therewith. The data output lines 92 from the counter 76 are connected to the input of the data register 90. Thus, in response to an overflow signal being provided on output line 74 of counter 68, the contents of counter 76 are read into the data register 90 and written into the auxiliary memory 86. The address of the location into which the data from counter 76 is written is determined by the information in the address register 88. The address register input lines 94 are derived from the output of a decoder means 96 responsive to a commutator device 98. The commutator device 98 is a cyclic counter which is incremented by each of the overflow signals appearing on output lines 74 of counter 68. The output of the decoder means 96 controls the switches 64 so that for each count defined by the commutator device 98, a different one of the switches 64 is closed.

In the operation of the apparatus of FIG. 2($a$), it is initially pointed out that each of the motors 20 drives the gear 60 coupled thereto at the speed thereof and that as a consequence, a pulse train (line A, FIG. 2($b$)) is developed by each of the detectors 62. One of the detectors 62 will be coupled through a closed switch 64, determined by the state of the commutator device 98, to the pulse shaper 66. The output of the pulse shaper 66 (line B, FIG. 2($b$)) will be applied to the input of the event counter 68. Let it be assumed that the control means 70 has defined eight active bits in the event counter 68 (i.e., $m=8$) meaning that the counter can count to 256 prior to providing an overflow signal on output line 74. When an overflow signal is provided by the event counter 68, it functions to reset both counters 68 and 76 and to increment the commutator 98 to close a different one of the switches 64. Thus, when the initial pulse from any of the detectors 62 is applied through the pulse shaper 66 to the event counter 68, the counter 68 will apply an enabling signal to the input terminal 72 of the counter 76 to cause it to start counting clock pulses (line C, FIG. 2($b$)) provided by the source 78. The source 78 should provide pulses at as high a frequency as is practicable in order to most precisely measure the time duration between the first and last pulses provided by each detector 62 to the counter 68. Each overflow signal provided by the counter 68 will cause the count in the counter 76 to be loaded into the memory 86 in a location dedicated to the detector 62 (and corresponding motor 20) to which it corresponds. Inasmuch as the commutator device 98 will be cyclically driven, the auxiliary memory 86 will at all times contain a number for each of the different motors 20 which number represents the time duration required to count a specific number of markers moving past a detector 62. The computer means 48 is capable of reading the auxiliary memory 86 under its own program control by applying an enabling signal to the memory read control terminal 100 and sensing the data appearing on the computer input terminal 102. In addition, the computer means 48 will continue to increment the address register via line 104 to thereby read all of the data in the memory 86. Utilizing this data, the computer means 48, as will be discussed below, can compute the absolute speed of each of the motors 20 and the draw between adjacent motors. By comparing the actual speeds and draws with stored or computed desired speeds and draws, it can control the potentiometer motors 52 to adjust the speeds of the motors 20.

Figure 2C:
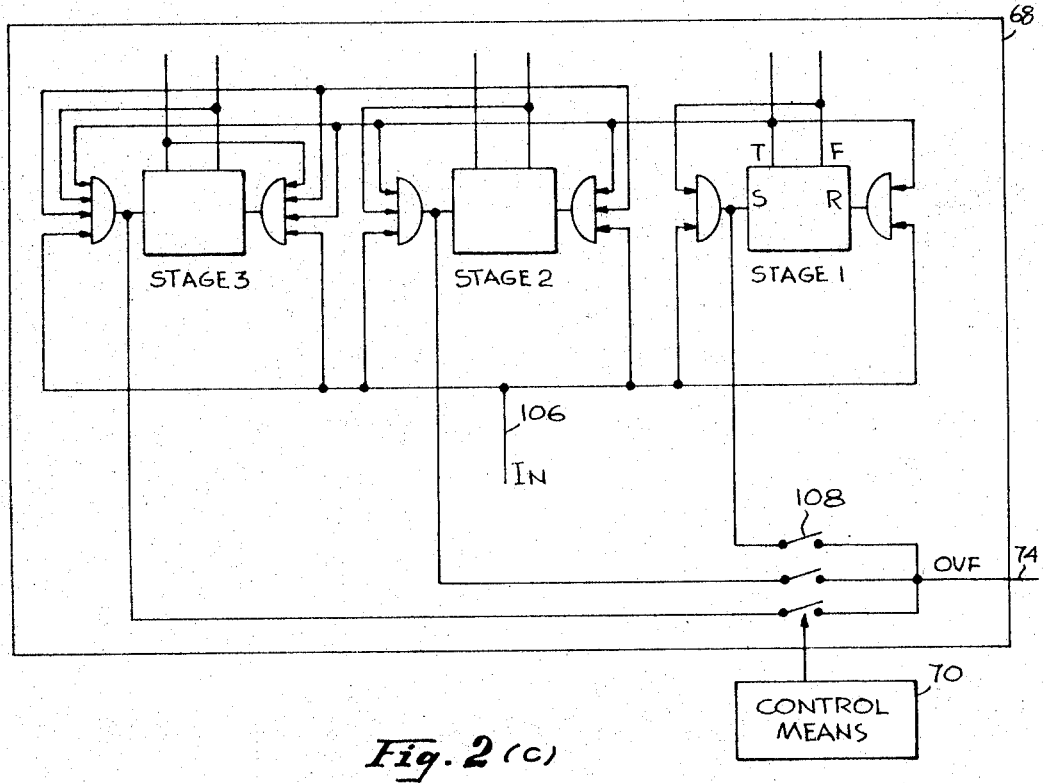
FIG. 2(c) is a schematic block diagram of the event counter of FIG. 2(a)

Attention is now called to FIG. 2(c) which illustrates a typical event counter 68 comprised of a plurality (e.g., three) of set-reset flip-flops interconnected to count in conventional binary fashion in response to pulses applied to an input terminal 106. The set input terminals of each of stages 1, 2, and 3 of the counter 68 are connected through a switch 108 to the overflow output lines 74. If the switch 108 connecting stage 1 to the line 74 is closed, then an overflow output pulse will be provided for every two counts in the counter 68. On the other hand if stage 2 is connected to the output line 74, an overflow pulse will be provided for every four counts, and if stage 3 is connected to the line 74, then an overflow pulse will be provided for every eight pulses applied to the counter 68. Thus, it should be appreciated that the counter 68 can be controlled to have any number of effective stages. Although a sufficient number of stages must be utilized to permit timing over an adequate duration i.e., an adequate number of events, if too many markers are counted, then the frequency with which each detector 62 can be looked at is reduced. Thus, a compromise must be effected depending upon the various system factors.

Figure 3:
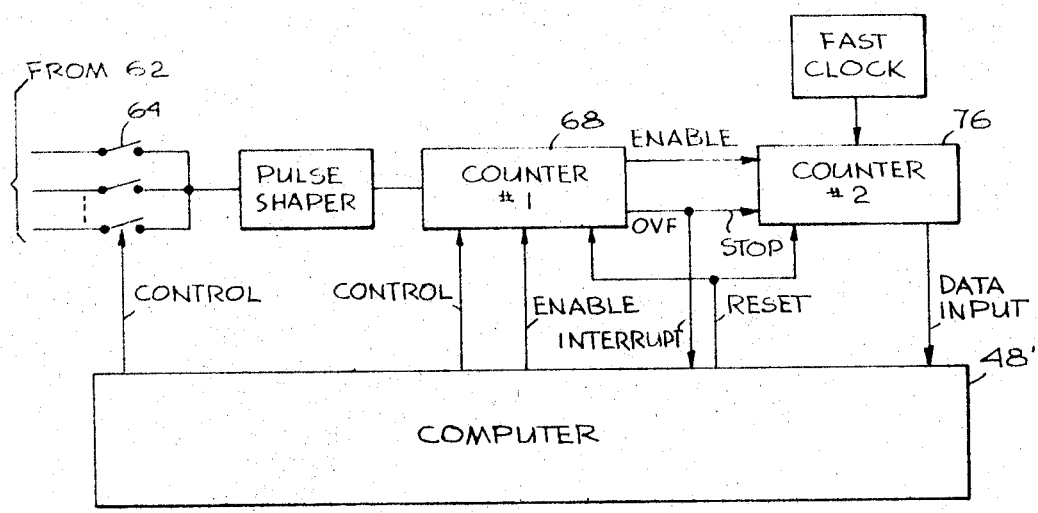
FIG. 3 is a schematic block diagram of an alternative embodiment of a speed measuring apparatus wherein a digital computer is employed to perform the functions of certain portions of the apparatus of FIG. 2(a)
Figure 4A:
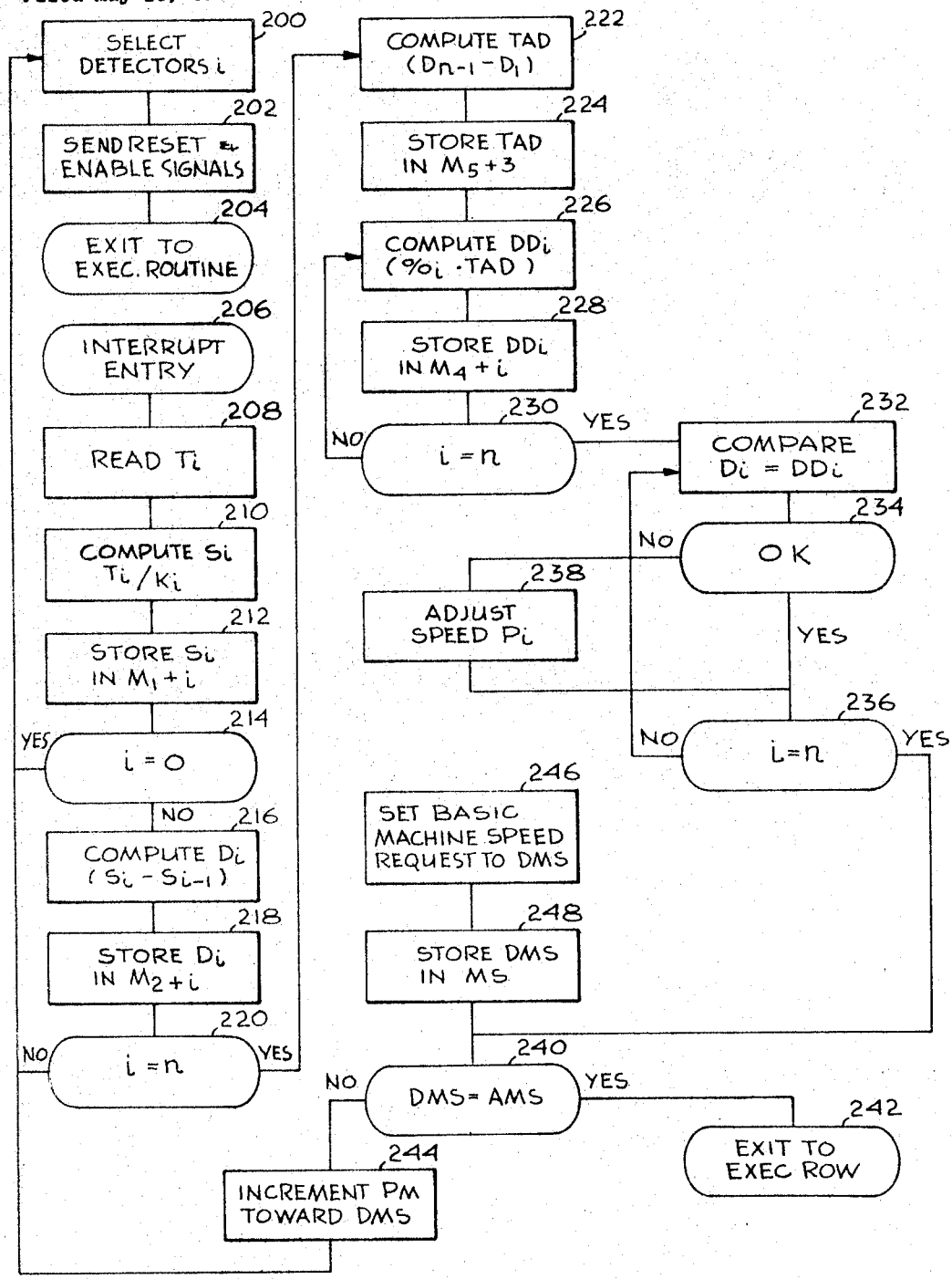
FIG. 4(a) is a flow chart illustrating an exemplary mode of operation for the computer of FIG. 3.
Figure 4:
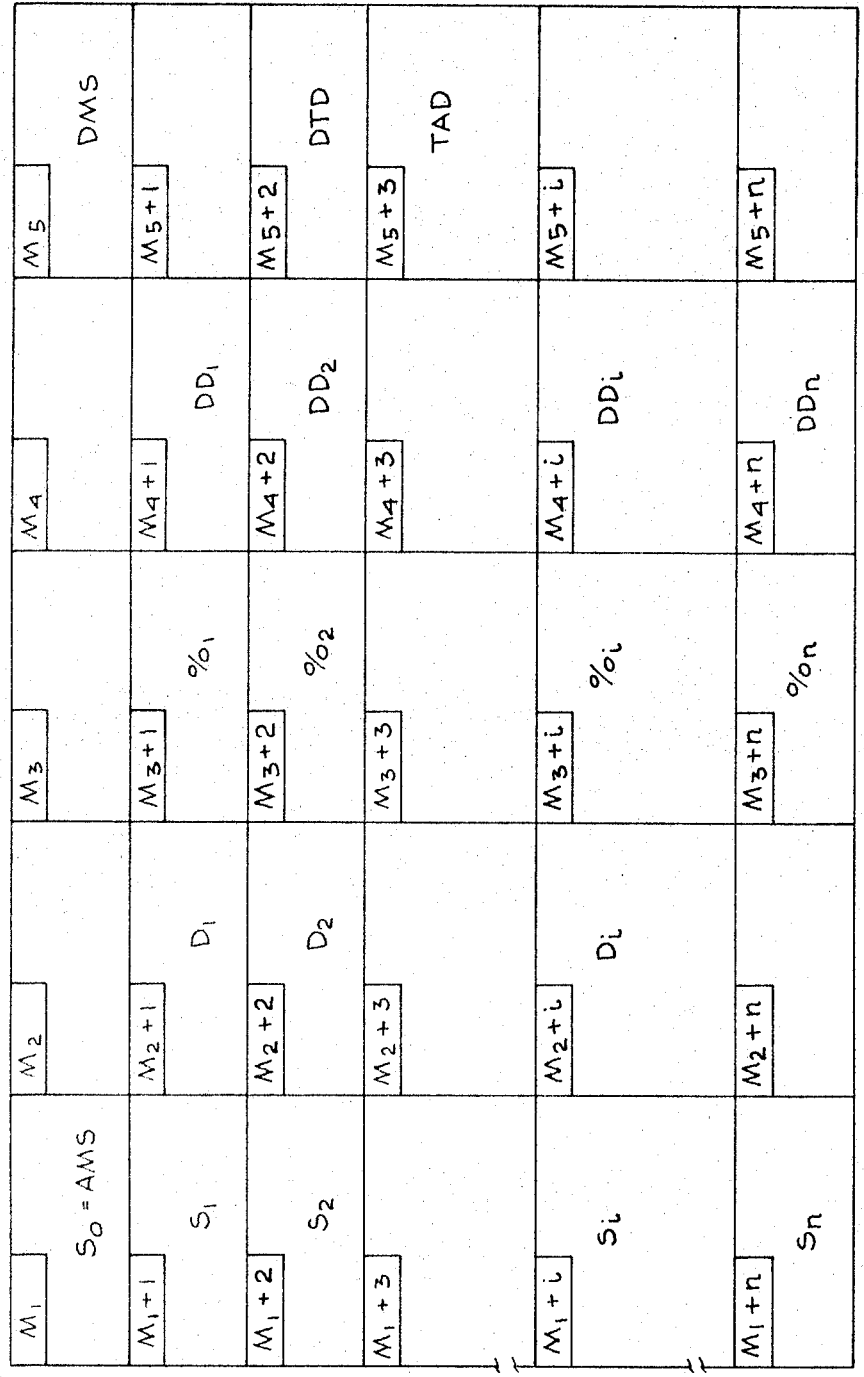
FIG. 4(b) schematically illustrates the manner in which information is stored in the memory of the computer of FIG. 3.

Attention is now called to FIG. 3 which illustrates an alternative embodiment of speed measuring means 50. In FIG. 3, in lieu of providing an auxiliary memory 86 and other special purpose hardware as in FIG. 2(a), the computer means 48' is utilized to directly control the switches 64 and counters 68 and 76. The computer 48' can be controlled by a program comprised of a set of instructions to which it is responsive, which can be stored in any one of a plurality of known types of memories. FIG. 4(a) illustrates a flow diagram describing an exemplary speed control operational mode for the computer 48'. The operational mode of FIG. 4(a) will be described in conjunction with an exemplary organization of data within the memory of the computer 48' as shown in FIG. 4(b).

Let it be assumed that the system includes $n$ motors 20 and that the actual speed of each of the motors is represented by the designations $S_1, S_2, \ldots S_i, \ldots S_n$. Let the symbol $D_1$ be defined as the draw or differential speed between the first and second motors 20 such that $D_1=S_2-S_1$ and $D_i=S_i-S_{i-1}$. Further let the designation $DD_1$ define the desired draw between the first and second motors 20. Also let each of the desired draws $DD_i$ be computable by a percentage ($\%_i$) of the total actual draw (TAD). The total actual draw will of course be equal to $S_n-S_1$ or the difference in speed between the first and last motors 20. Other quantities which shall be employed are the actual motor speed (AMS), the desired motor speed (DMS), and the desired total draw (DTD).

In the operation of the computer 48' it will initially select one of the detectors 62, i.e, $62_i$ by closing the switch 64 coupled to that detector. This operation is represented by block 200 in FIG. 4(a). Signals resetting counters 68 and 76 and enabling counter 68 are then generated as designated by operational step 202. Then the computer 48' can exit to an executive routine as designated by operational step 204. The computer 48' is then able to perform functions unrelated to the speed control of the motor 20 until an overflow signal is provided by counter 68 which interrupts the operation of the computer 48' and reenters the speed control mode as designated by operational step 206. Operational step 208 indicates the time duration in number of pulses $T_i$ read from counter 76 into the computer and operated upon by a constant $K_i$ to develop the speed $S_i$ in feet per minute of the motor 20 under consideration. It should be appreciated that the constant $K_i$ can be determined knowing the physical dimensions of the gear, teeth, etc. This computation is indicated by operational step 210. During operational step 212, the speed $S_i$ in feet per minute is stored in memory location $M_{1+i}$. When $i=0$, the speed of reference motor 32 is determined which defines the actual machine speed. After step 212 if $i=0$, as determined by operational step 214, a decision is made to initiate operational step 200 again incrementing the index $i$ prior thereto. On the other hand, if $i$ is not equal to zero, then the computer next performs operational step 216 which involves computing draws $D_i(S_i-S_{i-1})$ which is stored during operational step 218 in memory locaiton $M_{2+i}$. If $i$ equals $n$, then during operational step 220, the computer progresses to operational step 222 and if $i$ does not equal $n$, then the computer returns to operational step 200 incrementing $i$.

In operational step 222, the total actual draw is computed by determining the difference $(D_{n-1}-D_1)$. During operational step 224, the total actual draw is stored in an arbitrarily dedicated memory location $M_{5+3}$. It has been indicated that the percentages ($\%_i$) of the total actual draw represent the desired draws. Thus, during operational step 226, the desired draw $DD_i$ is computed and during operational step 228 is stored in memory location $M_{4+i}$. Then, if $i$ does not equal $n$, during operational step 230, the computer will return to operational step 226, incrementing index $i$, and if $i$ does equal $n$, the computer will progress to operational step 232 during which the actual draws $D_i$ are compared with the desired draws $DD_i$. The comparison steps represented in FIG. 4(a) can be performed in accordance with digital techniques very well known in the art. If the comparison indicates during operational step 234 that the desired and actual draws are equal within limits, the computer will progress to operational step 236. On the other hand, if the actual and desired draws being compared are not sufficiently close, operational step 238 will be defined during which the appropriate potentiometer motor 52 (FIG. 1) controlling a tap 46 will be energized to thereby move the tap 46 to vary the error potential across resistor 44 to thus adjust the set speed of the corresponding motor 20.

During operational step 236, if $i$ does not equal $n$ the computer will cycle to step 232 incrementing index $i$. On the other hand, if during operational step 236, $i$ does equal $n$, the computer will progress to operational step 240. During operational step 240, the desired machine speed which is stored in memory location $M_5$ will be compared with the actual machine speed previously stored in memory location $M_1$. If the desired machine and the actual machine speed are equal within limits, the computer will progress to operational step 242 from which it will exit to the executive routine. On the other hand, if the desired machine speed does not equal the actual machine speed, then the computer will progress to operational step 244, incrementing potentiometer motor 33 to thereby move tap 30 along potentiometer 31 to thus increase or decrease the overall machine speed. The computer will then exit from operational step 244 and enter step 200.

It is pointed out that in response to a basic machine speed request change by the operator, the computer will be forced into operational step 246 to accept the new desired machine speed which is then stored in memory location $M_5$ during operational step 248. After operational step 248, the computer will exit to operational step 240 previously discussed.

From the foregoing, it should be appreciated that a computer control system for automatically monitoring and controlling speeds has been disclosed herein which system includes an accurate speed measuring means. The speed measuring means employs a technique of counting a predetermined number of events and measuring the time duration over which these events occur. Thus, in a preferred embodiment of the speed measuring means first and second counters are provided with the first counter being responsive to variably occurring events and the second counter being controlled by the first counter and counting clock pulses. Although the utility of the speed measuring means has been disclosed primarily in conjunction with paper making apparatus, it should be appreciated that it finds significant utility in other areas also. Thus, for example, it can be used to measure liquid or gas flow by permitting the flow to drive a turbine or such whose speed is determined. Similarly, it finds utility in gasoline blending systems for example.

It is further pointed out that although the speed measuring subsystem has been illustrated as utilizing identical gears 60, it should be appreciated that these gears need not be identical inasmuch as the particular characteristics of each gear can be compensated for in the constant $K_1$ related thereto. Thus, for example, a gear can be provided with only one tooth if desired. It should, of course, be appreciated that the computer called for can comprise any one of many different models that are readily available on the market inasmuch as the calculations required are of a relatively simple nature. The speed of the computer may, however, determine the number of different motors which can be controlled for a particular rate of monitoring. Although speed regulators 26 have been shown herein for the purpose of illustrating the utility of the invention in substantially conventional systems, it is pointed out that the invention can be even more advantageously employed in a direct digital control system wherein the computer controls the speed of each motor directly without requiring the use of an analog set point device or regulator. Regardless of whether direct digital control or the illustrated regulators are employed, a system in accordance with the invention permits an integrated set of speeds to be maintained whereas conventional systems provide only for the individual control of individual speeds.

What is claimed is:

1. In an apparatus including a plurality of motors, wherein the speed of each motor is individually controllable, means for measuring and controlling said speeds, said means including:
   first means for identifying one of said motors;
   means responsive to said identified motor for providing pulses at a rate proportional to the speed thereof;
   first counting means for counting $n$ pulses provided by said first means;
   a time measuring means responsive to said first counting means for indicating the time duration between the first and the $n$th pulse counted;
   memory means for storing said indicated time duration; and
   means for resetting said first counting and time measuring means and for causing said first means to identify a subsequent one of said plurality of motors.

2. The apparatus of claim 1 including means responsive to said stored indicated time durations for computing and storing the speed of each of said motors;
   means storing the desired speed of each of said motors; and
   means for comparing the speed of each of said motors with the desired speed for that motor.

3. The apparatus of claim 1 including means for selectively defining said $n$th pulse.

4. In combination with an apparatus including a series of motors wherein the speed of each motor is individually adjustable, computer means for controlling said motor speeds comprising:
   means actuatable by said computer means for successively selecting each of said motors;
   means actuatable by said computer means for providing pulses at a rate proportional to the speed of the selected motor;
   means for measuring the absolute time duration during which $n$ pulses are provided;
   means in said computer means responsive to said measured time duration for computing and storing the actual speeds of said motors;
   comparison means in said computer means for comparing the actual speeds of said motors with the desired speeds thereof; and
   means responsive to said comparison means for adjusting the speeds of said motors.

5. The combination of claim 4 including means for computing the actual draw between adjacent motors in said series and the total actual draw between the first and last motors in said series; and
   means responsive to said total actual draw for computing desired draws between adjacent motors.

6. The combination of claim 1 including means in said computer means for defining the value of said $n$.

7. In a system wherein different sets of events can occur at randomly related rates, control means for monitoring and controlling said rates, said control means including:
   means for measuring the actual time interval over which $n$ of a first set of events occur and $m$ of a second set of events occur;
   means for computing the actual rates of said first and second sets of events;
   means for comparing said actual rates with predetermined desired rates; and
   means responsive to said means for comparing and controlling said actual rates.

8. The system of claim 7 including a motor and wherein said first set of events comprises pulses occurring at a rate proportional to the speed of said motor.

9. In combination with a system wherein different sets of events occur at individually controllable rates, computer means for controlling said rates comprising:
   means actuatable by said computer means for successively monitoring each set of events;
   means for measuring the absolute time duration over which a predetermined number of each set of events occurs;
   means in said computer means responsive to said measured time durations for computing and storing the actual rates of each set of events;
   comparison means in said computer means for comparing the actual rates of said sets of events with the desired rates thereof; and
   means responsive to said comparison means for controlling the rates of said sets of events.

References Cited

UNITED STATES PATENTS

| | | | |
|---|---|---|---|
| 2,705,303 | 3/1955 | Stinger | 310—112 XR |
| 2,886,775 | 5/1959 | Gross | 328—129 X |
| 3,064,173 | 11/1962 | Breen et al. | 318—77 X |
| 3,178,624 | 4/1965 | Borden | 318—341 X |

FOREIGN PATENTS 700,253   12/1964   Canada.

OTHER REFERENCES

"Pulse and Digital Circuits," Millman and Taub, McGraw-Hill Book Company, 1956, pp. 323–325, 344–346, and 508–509.

ORIS L. RADER, Primary Examiner

ALFRED G. COLLINS, Assistant Examiner

U.S. Cl. X.R.

318—329